(12) United States Patent
Zikes et al.

(10) Patent No.: US 9,405,303 B2
(45) Date of Patent: Aug. 2, 2016

(54) POWER STEALING FOR A WIRELESS-ENABLED THERMOSTAT

(71) Applicant: Emerson Electric Co., St. Louis, MO (US)

(72) Inventors: Bradley C. Zikes, Sunset Hills, MO (US); William P. Butler, Crestwood, MO (US); David L. Perry, Arnold, MO (US)

(73) Assignee: Emerson Electric Co., St. Louis, MO (US)

( * ) Notice: Subject to any disclaimer, the term of this patent is extended or adjusted under 35 U.S.C. 154(b) by 566 days.

(21) Appl. No.: 13/886,797

(22) Filed: May 3, 2013

(65) Prior Publication Data

US 2014/0312129 A1     Oct. 23, 2014

Related U.S. Application Data

(60) Provisional application No. 61/814,776, filed on Apr. 22, 2013.

(51) Int. Cl.
*G05D 23/19* (2006.01)
*H02M 7/06* (2006.01)
*H02M 1/00* (2006.01)

(52) U.S. Cl.
CPC ............. *G05D 23/1905* (2013.01); *H02M 7/06* (2013.01); *H02M 2001/0006* (2013.01)

(58) Field of Classification Search
CPC ............... G05D 23/1905; H02M 2001/0006; H02M 7/06
USPC ........................................... 700/83; 307/109
See application file for complete search history.

(56) References Cited

U.S. PATENT DOCUMENTS

| 5,192,874 | A | | 3/1993 | Adams | |
|---|---|---|---|---|---|
| 5,903,139 | A | * | 5/1999 | Kompelien | H02M 5/293 307/39 |
| 6,490,174 | B1 | * | 12/2002 | Kompelien | H02M 5/293 323/282 |
| 6,886,754 | B2 | * | 5/2005 | Smith | G05D 23/1904 236/10 |
| 6,998,816 | B2 | | 2/2006 | Wieck et al. | |
| 7,476,988 | B2 | | 1/2009 | Mulhouse et al. | |

(Continued)

OTHER PUBLICATIONS www.ritetemp-thermostats.com/60XX/6080.html; 2008 ©; 12 pgs.

(Continued)

*Primary Examiner* — Jared Fureman
*Assistant Examiner* — Michael Warmflash
(74) *Attorney, Agent, or Firm* — Harness, Dickey & Pierce, P.L.C.

(57) ABSTRACT

Disclosed are exemplary embodiments of apparatus, systems and methods for power stealing for a wireless-enabled thermostat. In an exemplary embodiment, a wireless-enabled thermostat generally includes a control having a wireless network interface that intermittently connects the thermostat in a wireless network in accordance with a duty cycle, the duty cycle having a connect time in which the thermostat is connected in the wireless network and a sleep time in which the thermostat is not connected in the wireless network. A power stealing circuit of the thermostat steals power through an "on-mode" load of a climate control system to charge a capacitor or other energy storage device to provide the power for the wireless network interface. The control adjusts at least the sleep time in accordance with a time for charging the capacitor or other energy storage device to a threshold voltage.

20 Claims, 2 Drawing Sheets

(56) References Cited

U.S. PATENT DOCUMENTS

| | | | |
|---|---|---|---|
| 7,755,220 B2 | 7/2010 | Sorg et al. | |
| 7,826,815 B2 | 11/2010 | Ajram et al. | |
| 8,110,945 B2 | 2/2012 | Simard et al. | |
| 8,195,313 B1 * | 6/2012 | Fadell | F24F 11/0009 236/1 C |
| 8,523,083 B2 * | 9/2013 | Warren | F24F 11/0012 200/50.08 |
| 9,092,039 B2 * | 7/2015 | Fadell | F24F 11/0086 |
| 2012/0126019 A1 * | 5/2012 | Warren | F24F 11/0012 236/51 |
| 2012/0126021 A1 * | 5/2012 | Warren | F24F 11/0012 236/1 C |
| 2012/0155137 A1 | 6/2012 | Simard et al. | |
| 2012/0199660 A1 * | 8/2012 | Warren | F24F 11/0012 236/1 C |
| 2012/0256009 A1 * | 10/2012 | Mucignat | G05D 23/1905 236/1 C |
| 2012/0325919 A1 * | 12/2012 | Warren | F24F 11/0012 236/1 C |
| 2013/0103204 A1 * | 4/2013 | Stefanski | G05D 23/1902 700/276 |
| 2013/0228633 A1 * | 9/2013 | Toth | G05D 23/1905 236/1 R |

OTHER PUBLICATIONS

Radio Thermostat Corporation of America; CT80 and CT30 Thermostats; Mar. 25, 2012; 1 pg.

http://support.nest.com/article/1st-generation-Nest-Learning-Thermostat-Installation-Guide; updated Oct. 11, 2012; 6 pgs.

Canadian Office Action issued in Canadian Patent Application No. 2,846,799 dated Aug. 26, 2015, which claims priority to the instant application; 3 pgs.

* cited by examiner

POWER STEALING FOR A WIRELESS-ENABLED THERMOSTAT

CROSS-REFERENCE TO RELATED APPLICATION

This application claims the benefit of U.S. Provisional Application No. 61/814,776 filed on Apr. 22, 2013. The entire disclosure of the above application is incorporated herein by reference.

FIELD

The present disclosure generally relates to power stealing, and more particularly (but not exclusively) to power stealing for a wireless-enabled thermostat.

BACKGROUND

This section provides background information related to the present disclosure which is not necessarily prior art.

Digital thermostats in climate control systems typically have microcomputers and other components that continuously use electrical power. A number of currently available thermostats also have wireless communication capabilities. Such a thermostat (referred to herein as a "wireless-enabled" thermostat) may be wirelessly connected, e.g., with one or more sensors in a network to provide climate control in a home or other structure.

SUMMARY

This section provides a general summary of the disclosure, and is not a comprehensive disclosure of its full scope or all of its features.

According to various aspects, exemplary embodiments are disclosed of apparatus, systems and methods for power stealing for a wireless-enabled thermostat. In an exemplary embodiment, a wireless-enabled thermostat for use in a climate control system generally includes a control having a wireless network interface configured to intermittently connect the thermostat in a wireless network in accordance with a duty cycle, the duty cycle having a connect time in which the thermostat is connected in the wireless network and a sleep time in which the thermostat is not connected in the wireless network. A power stealing circuit of the thermostat is configured to steal power through an "on-mode" load of the climate control system and to charge a capacitor or other energy storage device to provide the power for the wireless network interface. The control is configured to adjust at least the sleep time in accordance with a time for charging the capacitor or other energy storage device to a threshold voltage.

In another example embodiment, a wireless-enabled thermostat for use in a climate control system includes a control having a wireless network interface configured to intermittently connect the thermostat in a wireless network in accordance with a duty cycle, the duty cycle having a connect time in which the thermostat is connected in the wireless network and a sleep time in which the thermostat is not connected in the wireless network. A power stealing circuit is configured to steal power through an "on-mode" load of the climate control system and to charge an energy storage device over a time period varying with current through the "on-mode" load, to provide the power for the wireless network interface. The control is configured to adjust at least the sleep time in accordance with the varying time period.

Also disclosed, in one embodiment, is an example method that generally includes controlling a wireless network interface of the thermostat to intermittently connect the thermostat in a wireless network in accordance with a duty cycle, the duty cycle having a connect time in which the thermostat is connected in the wireless network and a sleep time in which the thermostat is not connected in the wireless network. The method includes stealing power through an "on-mode" load of the climate control system; using the stolen power for charging an energy storage device to provide the power for the wireless network interface; and adjusting at least the sleep time in accordance with a time for charging the energy storage device to a threshold voltage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventors hereof have recognized that currently available wireless-enabled thermostats typically require continuous power. Various digital thermostats utilize "off-mode" power stealing to obtain operating power. That is, when a climate control system load (e.g., a compressor, fan, or gas valve) has been switched off, power may be stolen from the "off-mode" load's circuit to power the thermostat. A wireless-enabled thermostat, however, consumes more power than generally would be available from batteries or from currently used methods of power stealing. Wireless-enabled thermostats typically are connected to a climate control system transformer "hot" wire (e.g., an R wire) and a common wire (e.g., a C wire), so that the full transformer voltage might be accessed to power the thermostat's wireless capability.

The inventors also have observed, however, that most current gas furnace applications do not make use of a C wire. Also, it often happens that a C wire is not provided in a wire bundle that has been run from a climate control system transformer to a thermostat. In such cases, a homeowner or contractor may find it necessary to pull a C wire, e.g., through walls and/or other infrastructure in order to be able to install a wireless-enabled thermostat.

Accordingly, the inventors have developed and disclose herein exemplary embodiments of apparatus, systems and methods of power stealing for a wireless-enabled thermostat.

In some embodiments, a wireless-enabled thermostat is provided in which a wireless interface may be powered by power stealing from a transformer through a load that is in an "on" mode, e.g., through a compressor when the thermostat is calling for cooling, and/or, e.g., through a gas valve when the thermostat is calling for heat.

Figure 1:
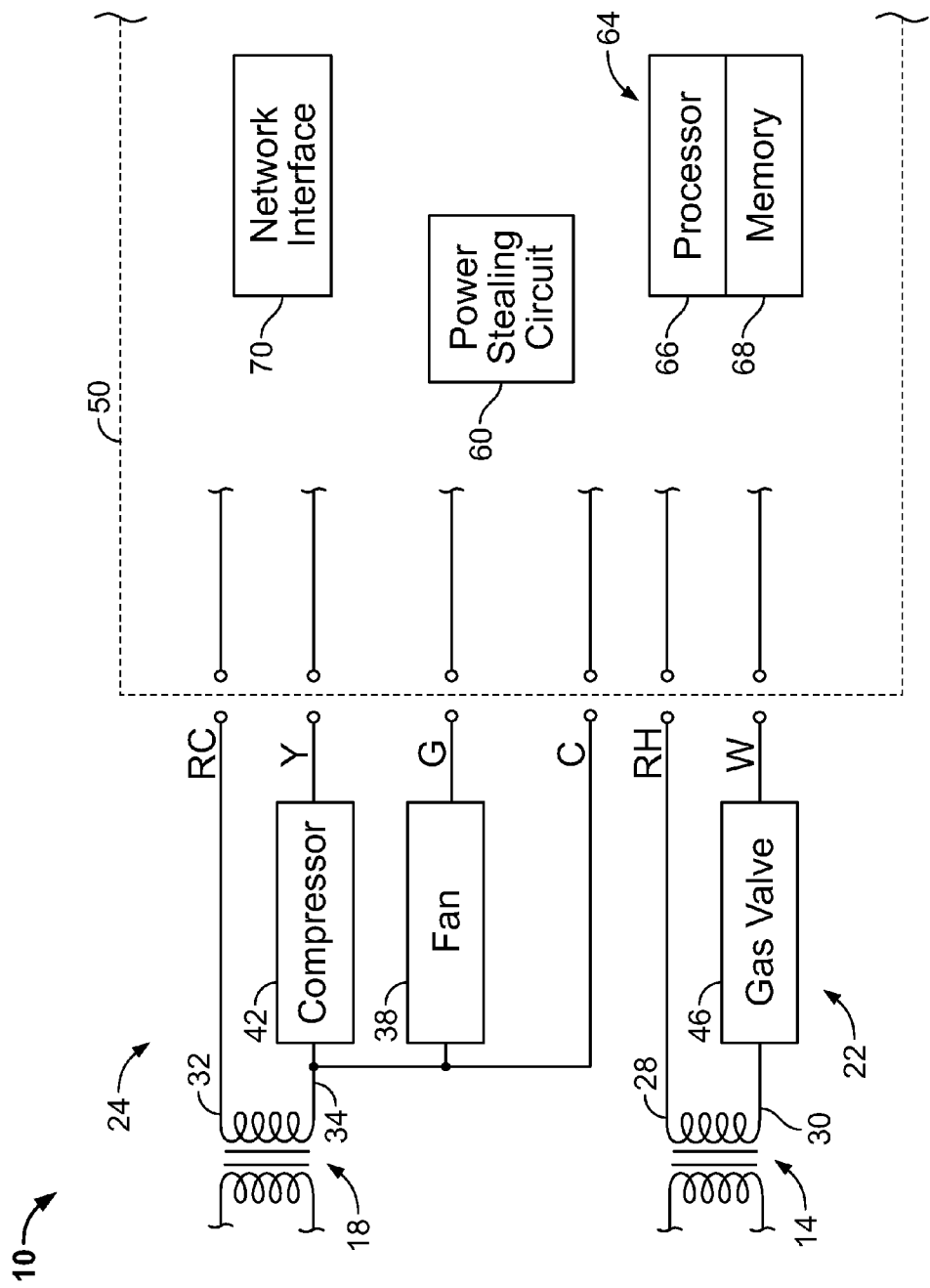
FIG. 1 is a diagram of an exemplary climate control system including a thermostat in accordance with an exemplary embodiment of the present disclosure.

With reference now to the figures, FIG. 1 illustrates an exemplary embodiment of a climate control system 10 embodying one or more aspects of the present disclosure. As shown in FIG. 1, the climate control system 10 includes two power sources, e.g., two transformers 14 and 18 for providing power respectively to a heating subsystem 22 and a cooling subsystem 24. The heating subsystem transformer 14 has a hot (typically 24-volt) side 28 and a common, i.e., neutral, side 30. The cooling subsystem transformer 18 has a hot (typically 24-volt) side 32 and a common, i.e., neutral, side 34. The cooling subsystem 24 includes a fan 38 and a compressor 42 connected on the common side 34 of the transformer 18. The heating subsystem 22 includes a furnace gas valve 46 connected on the common side 30 of the heating subsystem transformer 14. In the present example, a C terminal is provided from a common C wire connected, e.g., with the common side 34 of the transformer 18. In various embodiments of the disclosure, no C wire is used or even provided.

In one example embodiment, a thermostat 50 is provided for controlling operation of the climate control system 10. The thermostat 50 may activate one or more relays and/or other switching devices(s) (not shown in FIG. 1) to activate the heating subsystem 22 or cooling subsystem 24. When, e.g., a user operates the thermostat 50 to cause the climate control system 10 to provide heating, the thermostat 50 turns on the heating subsystem 22 and gas valve 46 by using a relay or other switching device to connect a "hot" terminal RH to a load terminal W. To provide cooling, the thermostat 50 may turn on the compressor 42 and/or fan 38 by using one or more relays or other switching device(s) to connect a "hot" terminal RC to load terminals Y and/or G.

An example power stealing circuit 60 may obtain power from the transformers 14 and/or 18 for the thermostat 50. In various embodiments of the disclosure, and as further described below, the power stealing circuit 60 may utilize "on-mode" power stealing. Stolen power may be used for powering one or more components of the thermostat 50, including but not necessarily limited to a control 64 having a processor 66 and memory 68, and a wireless network interface 70, e.g., a network interface card (NIC). The wireless network interface 70 is configured to provide intermittent connection of the thermostat 50 in a wireless network, e.g., a home network through which the user may communicate with an energy management service and manage climate control in the home using a wireless connection with the thermostat 50. In various embodiments, the thermostat 50 may be connected with the wireless home network in accordance with a duty cycle. The duty cycle has a connect time in which the thermostat 50 is connected in the wireless network, and a sleep time in which the thermostat 50 is in a "sleep" state, i.e., not connected in the wireless network. For example, the thermostat 50 may be connected with the wireless network for a connect time, e.g., of 30 seconds, after which the thermostat 50 sleeps for a sleep time of, e.g., 30 seconds, and so on.

The power stealing circuit 60 is configured to steal power through an "on-mode" load of the climate control system 10 to provide power for at least the wireless network interface 70 during connect times of the duty cycle as further described below. It should be noted generally that thermostat embodiments and/or power stealing circuit embodiments in accordance with various aspects of the disclosure could be installed in other types of climate control systems, including but not limited to systems having a single transformer, heat-only systems, cool-only systems, heat pump systems, etc. In some embodiments a C terminal may be provided, e.g., from the common side 30 of the transformer 14. In some other embodiments, a thermostat may not be provided with a connection to a common C wire. Further, the climate control system 10 shown in FIG. 1 provides single-stage heat and single-stage cooling. But in other embodiments, a thermostat having a power stealing circuit as described herein may be provided in a climate control system having multiple stages of heating and/or cooling.

Figure 2:
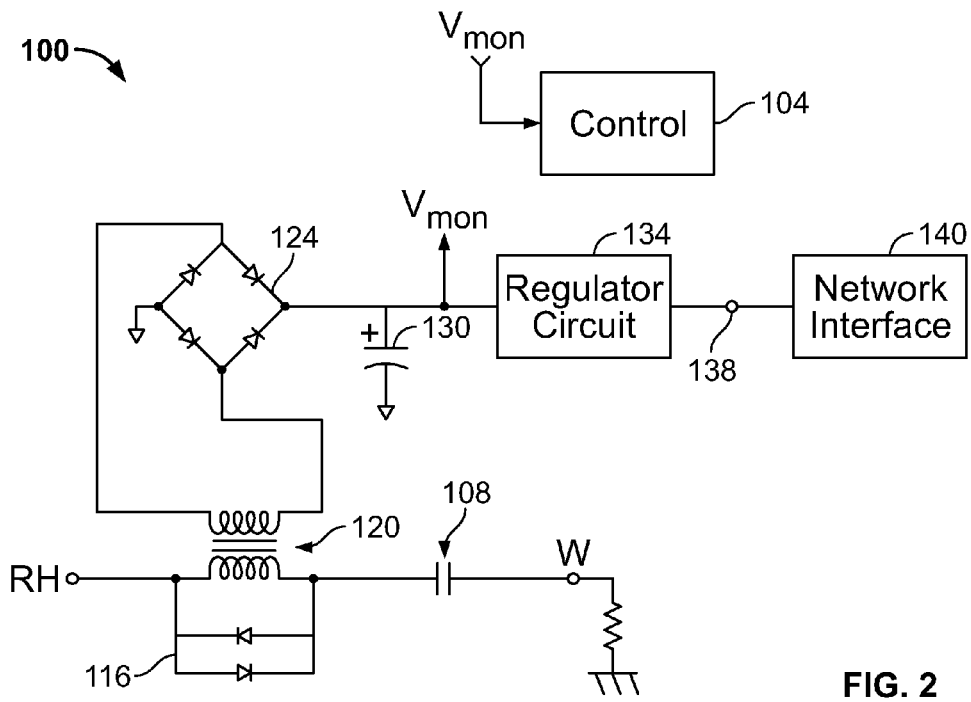
FIG. 2 is a diagram of an exemplary power stealing circuit in accordance with an exemplary embodiment of the present disclosure.

An example embodiment of a power stealing circuit is indicated in FIG. 2 by reference number 100. The power stealing circuit 100 may be adapted for use in a thermostat for any one of a plurality of climate control system types, e.g., systems having a single transformer, two-transformer systems, heat-only systems, cool-only systems, heat pump systems, etc. The power stealing circuit 100 may be configured to steal power through one or more climate control system loads. In various embodiments, the power stealing circuit 100 is configured to steal power from a load that is in an "on" mode.

In the example embodiment shown in FIG. 2, the power stealing circuit 100 is configured to steal power, e.g., from a heating subsystem controlled through a thermostat in which the power stealing circuit 100 is included. When, e.g., a user operates the thermostat to provide heating, a thermostat control 104 turns on the heating subsystem gas valve by closing relay(s) 108 to connect a "hot" terminal RH to a load terminal W. The power stealing circuit 100 includes a current sensor 116, e.g., a clipper circuit, a step-down current transformer 120, and a rectifier 124, e.g., a full wave rectifier. In some embodiments, a half-wave rectifier could be used. The rectifier 124 is connected across a high-voltage capacitor 130 (or other energy storage device) and a regulator circuit 134, e.g., a buck circuit, to provide an output 138 to a wireless network interface 140 of the thermostat. The regulator circuit 134 may be configured to reduce the capacitor voltage to a level compatible with the wireless network interface 140. The output 138 may be, e.g., a 3.3 VDC voltage.

The capacitor 130 becomes charged as rectified current flows through the rectifier 124. When the capacitor 130 is charged, e.g., to a threshold voltage, the regulator circuit 134 outputs power sufficient to make and at least temporarily maintain a network connection through the network interface 140. In various embodiments, the capacitor 130 typically takes a maximum of 30 seconds to charge to the threshold voltage. A voltage Vmon across the capacitor 130 is monitored by the control 104, which controls the wireless network interface 140 based at least in part on the capacitor voltage. The control 104 also controls the wireless network interface 140 based at least in part on a duty cycle as previously discussed with reference to FIG. 1.

Figure 3:
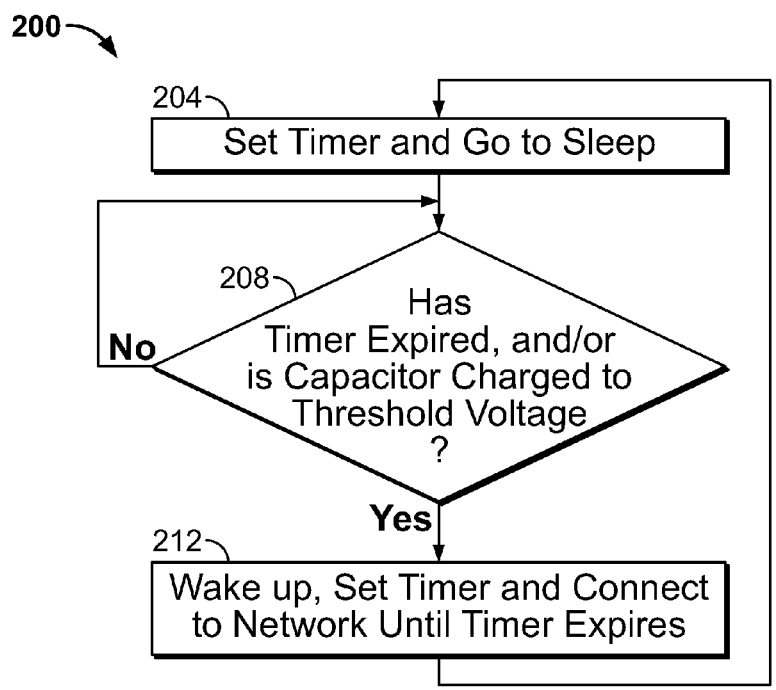
FIG. 3 is a flow diagram of a control-performed method for controlling wireless thermostat network connections in accordance with an exemplary implementation of the present disclosure.

One example control-performed method for controlling thermostat network connections through a network interface is indicated generally in FIG. 3 by reference number 200 and shall be described with reference to the power stealing circuit 100 shown in FIG. 2. In process 204, the control 104 sets a timer for a duty cycle sleep time, e.g., for 30 seconds, and causes the thermostat to "sleep." In process 208, it is determined whether the timer has expired and/or whether the capacitor 130 has become charged to a threshold voltage. In either or both events, the thermostat is caused in process 212 to "wake up," to set the timer for the duty cycle connect time of, e.g., 30 seconds, to connect with the wireless network, and possibly to send and/or receive information through the network. Thus, the control 104 may adjust at least the sleep time period in accordance with a time for charging the capacitor 130 to the threshold voltage. When the timer expires, control may return to process 204 in which the timer is reset and the thermostat returns to sleep. If in process 208 the timer is still active and the capacitor is not yet charged to the threshold voltage, then control returns to process 208.

As load current increases on the W wire, there is more current available from the current transformer 120. The capacitor 130 thus can be charged more quickly and can reach the threshold voltage more quickly than when a lower amount of current is available. At such times, the thermostat can be cycled more quickly through network connection cycles and can spend more time connected in the network than through adherence to only the predetermined duty cycle. In this way, performance of the example method 200 automatically adjusts the cycle times for network connections. The more power that can be stolen, the more frequently the network connections can be cycled, thereby reducing latency time to and/or from the network. In various embodiments, various capacitors and threshold capacitor voltages may be used in relation to, e.g., various types of regulator circuits, including but not limited to buck circuits, boost circuits, converter circuits, integrated circuits, etc. Additionally or alternatively, various duty cycles could be provided, e.g., to accommodate various capacitor charging times. In various embodiments, a thermostat may include a battery to provide backup power in the event that power stealing is not available. Additionally or alternatively, power can be stolen, e.g., from both "on-mode" and "off-mode" loads at the same time in some example embodiments.

Embodiments of the foregoing thermostats and power stealing circuits do not require a common wire to provide power for a wireless capability. Instead, a capacitor of a thermostat power stealing circuit can be used as a power reservoir that charges and discharges so that intermittent wireless network connections for network updates can be provided to the thermostat. In climate control systems in which both heating and cooling loads are available for power stealing, a wireless thermostat radio could be powered almost continuously (i.e., powered during duty cycle connection time periods that are long compared to sleep time periods.) In addition, exemplary embodiments are disclosed that include a capacitor. In alternative embodiments, other energy storage devices may be used besides capacitors, such as rechargeable batteries, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless-enabled thermostat for use in a climate control system, the thermostat comprising:
    a control having a wireless network interface configured to intermittently connect the thermostat in a wireless network in accordance with a duty cycle, the duty cycle having a connect time in which the thermostat is connected in the wireless network and a sleep time in which the thermostat is not connected in the wireless network; and
    a power stealing circuit configured to steal power through an "on-mode" load of the climate control system and to charge a capacitor to provide the power for the wireless network interface, the power stealing circuit having a step-down current transformer in series with a relay operable to switch the load between "on" and "off" modes, the step-down current transformer configured to obtain current from the "on-mode" load for charging the capacitor;
    the control configured to adjust at least the sleep time in accordance with a time for charging the capacitor to a threshold voltage.

2. The thermostat of claim 1, wherein the time for charging the capacitor varies with current through the "on-mode" load.

3. The thermostat of claim 1, wherein the power stealing circuit comprises:
    a clipper circuit connected across the step-down current transformer;
    a rectifier connected between the step-down current transformer and the capacitor and configured to charge the capacitor from the step-down current transformer; and
    a regulator circuit for powering the wireless network interface, the regulator circuit powered by the capacitor.

4. The thermostat of claim 3, wherein the control is configured to monitor the charge of the capacitor and control the regulator circuit based on the monitoring.

5. The thermostat of claim 3, wherein the regulator circuit comprises a buck circuit.

6. The thermostat of claim 1, wherein the power stealing circuit is configured to steal power without using a climate control system common "C" wire.

7. The thermostat of claim 1, wherein the control is configured to provide intermittent connection of the thermostat with the wireless network substantially only when power from the power stealing circuit is available.

8. The thermostat of claim 1, wherein the control is configured to disconnect the thermostat from the wireless network when power from the power stealing circuit has become unavailable, and reconnect the thermostat in the wireless network when power from the power stealing circuit has been restored.

9. The thermostat of claim 1, wherein the sleep time decreases with increasing current through the "on-mode" load.

10. A wireless-enabled thermostat for use in a climate control system, the thermostat comprising:
    a control having a wireless network interface configured to intermittently connect the thermostat in a wireless network in accordance with a duty cycle, the duty cycle having a connect time in which the thermostat is connected in the wireless network and a sleep time in which the thermostat is not connected in the wireless network; and
    a power stealing circuit configured to steal power through an "on-mode" load of the climate control system and to charge an energy storage device over a time period varying with current through the "on-mode" load, to provide the power for the wireless network interface, the power stealing circuit having a step-down current transformer in series with a relay operable to switch the load between "on" and "off" modes, the step-down current transformer configured to obtain current from the "on-mode" load for charging the energy storage device;
    the control configured to adjust at least the sleep time in accordance with the varying time period.

11. The thermostat of claim 10, wherein the power stealing circuit comprises:
    a clipper circuit connected across the step-down current transformer;
    a rectifier connected between the step-down current transformer and the energy storage device and configured to charge the energy storage device from the step-down current transformer; and
    a regulator circuit for powering the wireless network interface, the regulator circuit powered by the energy storage device.

12. The thermostat of claim 11, wherein:
    the energy storage device comprises a capacitor; and
    the control is configured to monitor the charge of the capacitor and control the regulator circuit based on the monitoring.

13. The thermostat of claim 11, wherein the regulator circuit comprises a buck circuit.

14. The thermostat of claim 10, wherein the power stealing circuit is configured to steal power without using a climate control system common "C" wire.

15. The thermostat of claim 10, wherein the control is configured to provide intermittent connection of the thermostat with the wireless network substantially only when power from the power stealing circuit is available.

16. The thermostat of claim 10, wherein the control is configured to disconnect the thermostat from the wireless network when power from the power stealing circuit has become unavailable, and reconnect the thermostat in the wireless network when power from the power stealing circuit has been restored.

17. The thermostat of claim 10, wherein the sleep time decreases with increasing current through the "on-mode" load.

18. A method of communicating in a wireless network, the method performed by a wireless thermostat of a climate control system, the method comprising:

controlling a wireless network interface of the thermostat to intermittently connect the thermostat in a wireless network in accordance with a duty cycle, the duty cycle having a connect time in which the thermostat is connected in the wireless network and a sleep time in which the thermostat is not connected in the wireless network;

stealing power through an "on-mode" load of the climate control system, the stealing performed at least in part by receiving current from the "on-mode" load from a step-down current transformer in series with a relay operable to switch the load between "on" and "off" modes and using the received current for charging an energy storage device to provide the power for the wireless network interface, where the current being received from the step-down current transformer for the charging increases as current increases through the "on-mode" load; and adjusting at least the sleep time in accordance with a time for charging the energy storage device to a threshold voltage.

19. The method of claim 18, wherein the sleep time period decreases with increasing current through the "on-mode" load.

20. The method of claim 18, wherein:

the energy storage device comprises a capacitor; and
the method further comprises:
determining whether a duty cycle timer has expired and/or whether the capacitor is charged to the threshold voltage; and
based on the determining, initiating a connect time and resetting the timer.

\* \* \* \* \*